United States Patent
Gailloux et al.

(10) Patent No.: US 8,644,813 B1
(45) Date of Patent: Feb. 4, 2014

(54) CUSTOMER INITIATED MOBILE DIAGNOSTICS SERVICE

(75) Inventors: Michael A. Gailloux, Overland Park, KS (US); Kenneth W. Samson, Belton, MO (US)

(73) Assignee: Sprint Communications Company L.P., Overland Park, KS (US)

(*) Notice: Subject to any disclaimer, the term of this patent is extended or adjusted under 35 U.S.C. 154(b) by 726 days.

(21) Appl. No.: 12/629,860

(22) Filed: Dec. 2, 2009

(51) Int. Cl.
*H04W 24/00* (2009.01)
*H04B 17/00* (2006.01)

(52) U.S. Cl.
USPC ........... 455/423; 455/424; 455/425; 455/446; 455/67.11; 455/115.1; 455/226.1

(58) Field of Classification Search
USPC ........... 455/423, 424, 425, 446, 67.11, 115.1, 455/226.1
See application file for complete search history.

(56) References Cited

U.S. PATENT DOCUMENTS

| | | | |
|---|---|---|---|
| 6,055,433 A | 4/2000 | Yuan et al. | |
| 6,912,574 B2 | 6/2005 | Scifres et al. | |
| 7,293,201 B2 * | 11/2007 | Ansari | 714/38.14 |
| 7,693,876 B2 | 4/2010 | Hackworth et al. | |
| 7,797,343 B2 | 9/2010 | Morain et al. | |
| 8,406,756 B1 | 3/2013 | Reeves et al. | |
| 8,422,988 B1 | 4/2013 | Keshav | |
| 8,588,764 B1 | 11/2013 | Koller et al. | |
| 2002/0072359 A1* | 6/2002 | Moles et al. | 455/425 |
| 2003/0027580 A1 | 2/2003 | Goodjohn et al. | |
| 2003/0139905 A1 | 7/2003 | Helsper et al. | |
| 2004/0203755 A1 | 10/2004 | Brunet et al. | |
| 2004/0218602 A1 | 11/2004 | Hrastar | |
| 2005/0055426 A1 | 3/2005 | Smith et al. | |
| 2005/0107107 A1 | 5/2005 | Shahidi et al. | |
| 2005/0262563 A1 | 11/2005 | Mahone et al. | |
| 2006/0223495 A1 | 10/2006 | Cassett et al. | |
| 2006/0233114 A1* | 10/2006 | Alam et al. | 370/252 |
| 2006/0234698 A1* | 10/2006 | Fok et al. | 455/425 |
| 2007/0180521 A1 | 8/2007 | Malkin et al. | |
| 2007/0206546 A1 | 9/2007 | Alberth, Jr. et al. | |
| 2007/0207800 A1* | 9/2007 | Daley et al. | 455/425 |
| 2008/0214186 A1* | 9/2008 | Bizzarri et al. | 455/425 |
| 2008/0274716 A1* | 11/2008 | Fok et al. | 455/410 |
| 2008/0288946 A1 | 11/2008 | Richards et al. | |
| 2008/0301295 A1 | 12/2008 | Malkin et al. | |

(Continued)

OTHER PUBLICATIONS

Contino, Jeff, et al., U.S. Patent Application entitled, "Evaluation of Mobile Device State and Performance Metrics for Diagnosis and Troubleshooting of Performance Issues", filed Oct. 18, 2012, U.S. Appl. No. 13/655,333.

(Continued)

*Primary Examiner* — Wen Huang

(57) ABSTRACT

A customer initiated mobile service diagnostics system is provided. The system comprises a database containing diagnostic data, a computer system, and an application, that when executed on the computer system, receives a message from a portable electronic device enrolling for diagnostic services. The system also sends a message to activate diagnostics software on the portable electronic device and receives notification of at least one service problem experienced by the portable electronic device. The system also analyzes data stored by at least one of the portable electronic device and the database to identify the root cause of the at least one service problem. The system also sends information to the portable electronic device providing resolution of the root cause of the at least one service problem.

18 Claims, 6 Drawing Sheets

(56) References Cited

U.S. PATENT DOCUMENTS

| | | |
|---|---|---|
| 2009/0049544 A1 | 2/2009 | Kashi |
| 2009/0156199 A1* | 6/2009 | Steenstra et al. ............ 455/425 |
| 2009/0213871 A1 | 8/2009 | Carlson et al. |
| 2009/0288144 A1 | 11/2009 | Huber et al. |
| 2010/0195503 A1 | 8/2010 | Raleigh |
| 2010/0197238 A1* | 8/2010 | Pathuri et al. ............ 455/67.11 |
| 2010/0235918 A1 | 9/2010 | Mizrahi et al. |
| 2010/0281155 A1* | 11/2010 | Cipollone et al. ............ 709/224 |
| 2010/0330954 A1 | 12/2010 | Manning Cassett et al. |
| 2011/0098018 A1 | 4/2011 | Engel |
| 2011/0161484 A1 | 6/2011 | Van den Bogaert et al. |
| 2011/0199934 A1 | 8/2011 | Olofsson et al. |
| 2011/0213865 A1 | 9/2011 | Durazzo et al. |
| 2011/0280130 A1 | 11/2011 | Foottit et al. |
| 2011/0320607 A1 | 12/2011 | Harrang et al. |
| 2012/0084184 A1 | 4/2012 | Raleigh et al. |
| 2012/0101952 A1 | 4/2012 | Raleigh et al. |
| 2012/0102191 A1 | 4/2012 | Rabii |
| 2012/0108225 A1 | 5/2012 | Luna et al. |
| 2012/0115433 A1 | 5/2012 | Young et al. |
| 2012/0117478 A1 | 5/2012 | Vadde et al. |
| 2012/0196543 A1 | 8/2012 | Andersson et al. |
| 2012/0221955 A1 | 8/2012 | Raleigh et al. |
| 2012/0252357 A1 | 10/2012 | Tarleton et al. |
| 2013/0007245 A1 | 1/2013 | Malik et al. |
| 2013/0018965 A1 | 1/2013 | Ramachandran et al. |
| 2013/0023230 A9 | 1/2013 | Momtahan et al. |
| 2013/0031599 A1 | 1/2013 | Luna et al. |
| 2013/0036450 A1 | 2/2013 | Kim et al. |

OTHER PUBLICATIONS

Contino, Jeff, et al., Patent Application entitled, "Application Risk Analysis", filed Nov. 19, 2012, U.S. Appl. No. 13/681,337.

Koller, Gary D., et al., Patent Application entitled "Wireless Network Edge Guardian," filed Jan. 26, 2012, U.S. Appl. No. 13/359,311.

Sung, Dan, App of the Day—3G Watchdog (Android), http://www.pooket-lint.com/news/103874-data-monitoring-app-for-android, May 26, 2010.

FAIPP Pre-Interview Communication dated May 6, 2013, U.S. Appl. No. 13/359,311, filed Jan. 26, 2013.

Notice of Allowance dated Jul. 1, 2013, U.S. Appl. No. 13/359,311, filed Jan. 26, 2012.

\* cited by examiner

FIG. 5
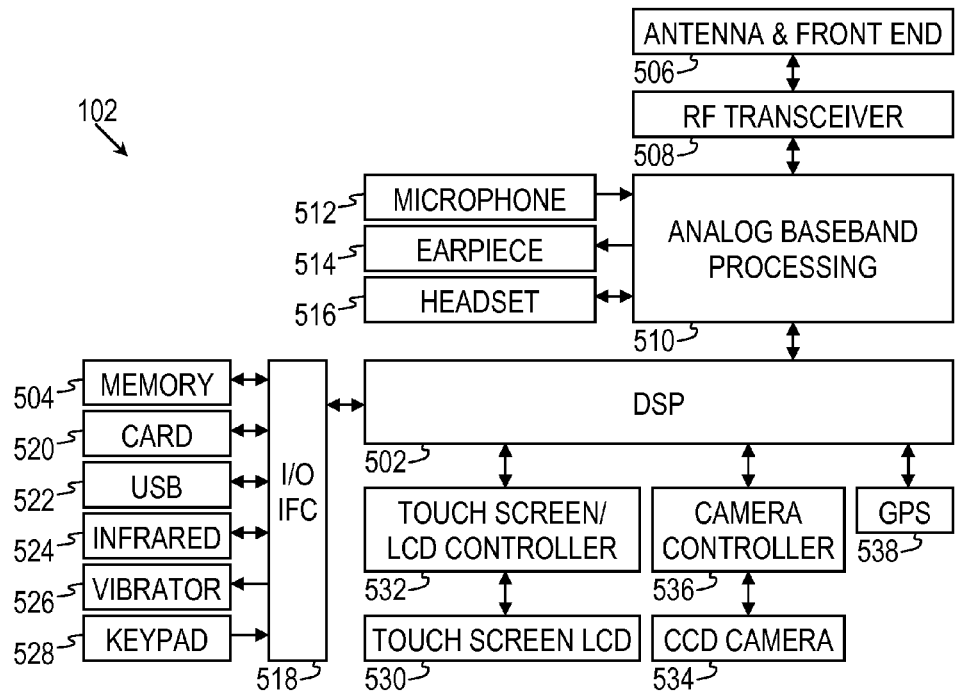
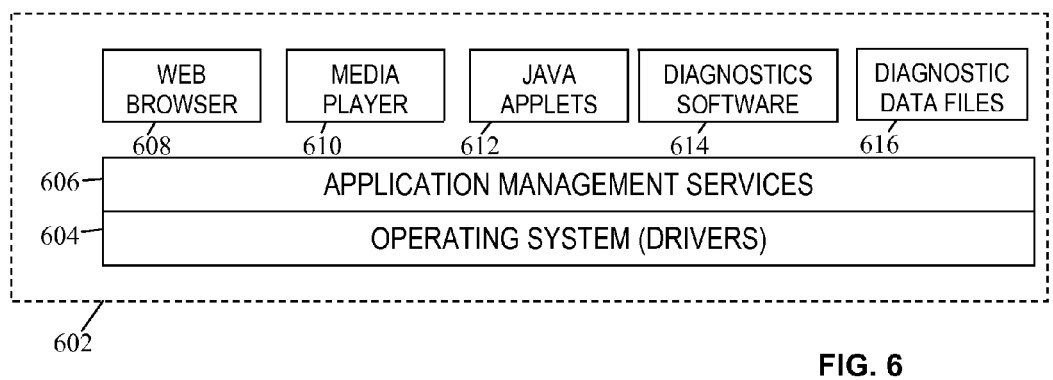
FIG. 6

CUSTOMER INITIATED MOBILE DIAGNOSTICS SERVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices used for mobile voice or data communication over networks of specialized base stations known as cell towers or sites. In addition to the standard voice function of a mobile telephone, current mobile phones and other similar portable electronic devices may support additional services including short message service (SMS) for text messaging, electronic mail, and packet switching for access to the Internet. Other services include gaming, Bluetooth, infrared, camera with video recorder, multimedia messaging services (MMS) for sending and receiving photographs and downloading of video, MPEG-1 Audio Layer 3 (MP3) for audio storage, radio, and global positioning system services. Current mobile telephone and other portable electronic devices connect to cellular networks consisting of switching points and base stations owned by mobile network operators. Mobile phones, personal digital assistants (PDA), and other similar devices may also provide for memorandum and document recording, personal organizer and personal digital assistant functions, and instant messaging services, and may serve as wireless modems for personal computers and as a console to online games.

SUMMARY

In an embodiment, a customer initiated mobile diagnostics service system is provided. The system comprises a database containing diagnostic data, a computer system, and an application, that when executed on the computer system, receives a message from a portable electronic device enrolling for diagnostic services. The system also sends a message to activate diagnostics software on the portable electronic device and receives notification of at least one service problem experienced by the portable electronic device. The system also analyzes data stored by at least one of the portable electronic device and the database to identify the root cause of the at least one service problem. The system also sends information to the portable electronic device providing resolution of the root cause of the at least one service problem.

In an embodiment, a processor-implemented method for providing customer initiated mobile diagnostics service is provided. The method comprises a portable electronic device self-enrolling for diagnostics service and a diagnostics server activating diagnostics software on the portable electronic device providing diagnostics service on the portable electronic device. The method also comprises the diagnostics server receiving a first message reporting a service problem on the portable electronic device. The method also comprises the diagnostics server aggregating data stored in at least one of the portable electronic device and a database about the services in use by the portable electronic device at the time of the service problem. The method also comprises the diagnostics server aggregating data about the positioning of the portable electronic device and network conditions at the time of the service problem. The method also comprises the diagnostics server analyzing the data about the positioning and services in use by the portable electronic device and the network conditions at the time of the service problem to identify the root cause of the service problem. The method also comprises the diagnostics server sending a second message to the portable electronic device providing information on the root cause of the service problem to prevent a future service problem.

In an embodiment, a processor-implemented method for providing customer initiated mobile diagnostics service is provided. The method comprises a diagnostics server identifying the occurrence of at least one service problem experienced by a portable electronic device. The method also comprises the diagnostics server sending a first message to the portable electronic device confirming the at least one service problem. The method also comprises the diagnostics server identifying the services in use by the portable electronic device at the time of the occurrence of the at least one service problem. The method also comprises the diagnostics server identifying the location of the portable electronic device at the time of the occurrence of the at least one service problem. The method also comprises the diagnostics server determining that a service problem with a vendor of electronic services is the root cause of the at least one service problem. The method also comprises the diagnostics server sending a second message to the portable electronic device providing information about the root cause of the at least one service problem.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 5 is a block diagram of a portable electronic device according to an embodiment of the disclosure.

FIG. 6 is a block diagram of a software configuration for a portable electronic device according to an embodiment of the disclosure.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Embodiments of the present disclosure teach self-enrollment by a mobile communications device for diagnostic services, gathering of diagnostic data from the device and other sources, analysis of the data, and recommendation of changes to device settings and usage practices and technical changes by a service provider when appropriate. A mobile device experiencing interruptions or degradations of voice or data services and seeking improved service may self-enroll for diagnostics service with a diagnostics server. Software is activated on the device upon self-enrollment. The software may monitor, test, and report application, operating system software, and hardware activity and service levels observed on the device. The software may detect and report errors, service interruptions and degradations, and hardware problems experienced by the device.

The diagnostics server receives the reported data from the mobile device. The server also gathers performance metrics and other data related to the mobile device from service providers about service delivery, signal strength, and radio frequency levels in their coverage areas. The server also receives information from service providers and other network sources about the geographic locations and physical movements of the mobile device while using voice, data, and other applications. The server analyzes the data received from the mobile device and service providers and may identify the root causes of service interruptions and other problems. The server may make recommendations to the mobile device for changes in usage practices and habits and may provide feedback to service providers about adjustments they may make to improve their service.

The server also may refer the information gathered to a customer care unit that may further analyze the information, make preparations for possible customer contact, and be positioned to provide a richer customer service experience than would be available without the customer having self-enrolled for diagnostic services. By enabling a customer to self-enroll, by providing a customer care function of a wireless service provider the ability to receive and respond to reports of customer experiences, and by initiating contact with a customer about service experiences, a service provider may communicate sincere empathy for customer experience, build customer loyalty, and promote expansion of the customer relationship.

Figure 1:
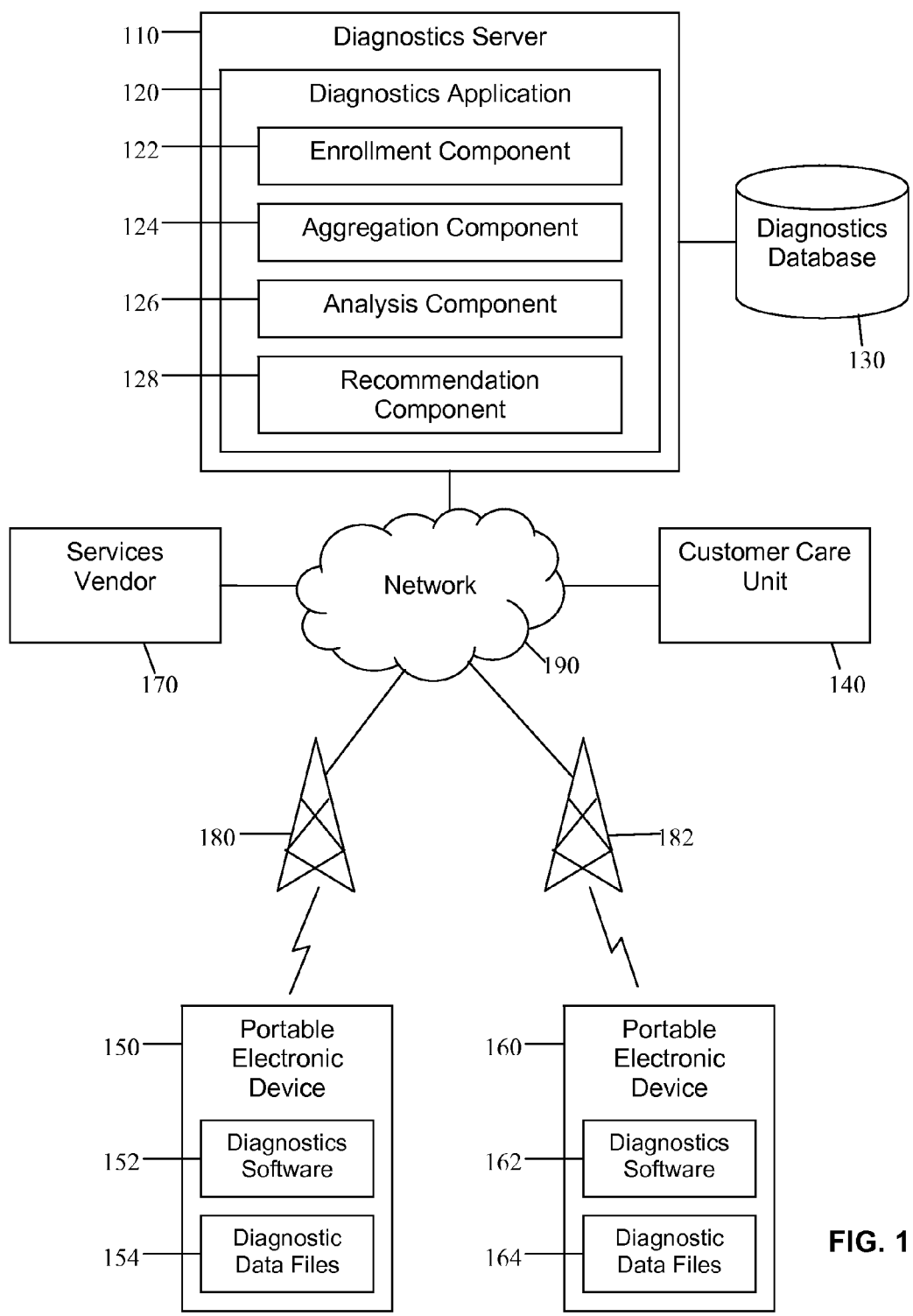
FIG. 1 is a block diagram of a system according to an embodiment of the disclosure.

Turning now to FIG. 1, a system 100 for customer initiated mobile diagnostics service is provided. The system 100 comprises a diagnostics server 110, a diagnostics application 120, a diagnostics database 130, a customer care unit 140, portable electronic devices 150, 160, diagnostics software 152, 162, diagnostics data files 154, 164, a services vendor 170, base transceiver stations 180, 182, and a network 190.

The diagnostics server 110 may be a computer system. Computer systems are discussed in greater detail hereinafter. The diagnostics server 110 may comprise one computer or a plurality of computers, for example, a server farm wherein many server computers cooperate to share a processing load. The diagnostics server 110 may comprise a plurality of computers that are located at different places, for example, to provide geographical diversity and increased service reliability. The diagnostics server 110 executes one or more applications including the diagnostics application 120.

The diagnostics application 120 receives messages from portable electronic devices 150, 160 requesting subscription to diagnostic and other services performed by the diagnostics application 120 and other components of the system 100. When the diagnostics application 120 provisions the portable electronic device 150 for diagnostic services, the diagnostics application 120 may activate diagnostics software 152 on the portable electronic device 150. The diagnostics software 152 may monitor and report voice and data communications activity as well as the hardware status and configuration of applications of the portable electronic device 150. For example, the diagnostics software 152 may monitor and report battery parameters over time. The diagnostics software 152 may monitor and report the activities of operating system software or other software. In an embodiment, the diagnostics software 152 may be software agents.

The diagnostics application 120 also may access information stored in the database 130 and in other network components about the usage of services by the portable electronic device 150 and prevailing network conditions when the portable electronic device 150 was using services. Information may also be gathered about the status and performance of vendors of data and communication services used by the portable electronic device 150 and infrastructure and network conditions impacting those services. The diagnostics application 120 analyzes the information gathered from the portable electronic device 150, the database 130, and other sources, particularly when the diagnostics application 120 detects that the portable electronic device 150 may be experiencing problems with one or more voice, data, or other applications or when the portable electronic device 150 reports a problem. The diagnostics application 120 may make recommendations to the portable electronic device 150 about its use of applications and services that may assist the portable electronic device 150 in realizing better performance in the future. The diagnostics application 120 may in addition or alternatively make contact with vendors of services provided to the portable electronic device 150 and make suggestions or specify requirements for adjusting their service to provide an improved customer experience. The portable electronic devices 150, 160 may be any of a mobile telephone, a personal digital assistant (PDA), and a media player.

The diagnostics application 120 comprises the enrollment component 122 that receives requests from portable electronic devices 150, 160 to subscribe for diagnostic services that cause service problems experienced by portable electronic devices 150, 160 to be detected, investigated, and potentially resolved. Service problems may include a variety of problems including unavailable communication service, dropped calls, garbled voice communication, voice mail problems, battery life problems, slow throughput of data communications, and others. Provisioning of the diagnostic services may include the installation and/or activation of diagnostics software 152 on the portable electronic device 150 that reports activity and/or operating conditions on the portable electronic device 150 during times of normal operation as well as when service problems occur. The diagnostics software 152 may monitor user actions on the portable electronic device 150 and may assist in monitoring the physical movement of the portable electronic device 150. Because some service problems and other abnormal conditions may be related to the positioning and movement of the portable electronic device 150, gathering information about location, movements, and operations of the portable electronic device 150 at the times of service problems may be important to problem resolution. The diagnostics software 152 activated on the portable electronic device 150 by the enrollment component 122 also may report service usage activity and the results of diagnostic tests run on the portable electronic device 150. The usage activity reports and test results run by the diagnostics software 152, which may be stored on the portable electronic device 150 as diagnostic data files 154, may be transmitted to the diagnostics application 120 for immediate analysis and/or may be transmitted to the database 130 for storage and possible later analysis.

In an embodiment, the diagnostics service provided by the diagnostics application 120 may be made available to the portable electronic device 150 for a fee, for example through a limited time duration subscription. In an embodiment, the enrollment component 122 may offer the portable electronic device 150 the opportunity to receive reports describing services usage, geographic positioning, and summaries of problems experienced during a time period, for example dropped calls. The enrollment component 122 may mark the account of the portable electronic device 150 so that authorized parties including the customer care unit 140 may view the account status and activities of the portable electronic device 150 and be made aware that the portable electronic device 150 is enrolled for diagnostic services. When the diagnostics server 110 is operated by a wireless service provider, the enrollment component 122 may provide notification of the enrollment for diagnostics service to additional areas of the service provider, for example a marketing and sales unit, because the enrollment for diagnostics service may correlate with a dissatisfied wireless subscriber at risk of canceling his or her wireless services plan.

The enrollment component 122 notifying the customer care unit 140 may allow the customer care unit 140 to analyze the service experiences of the portable electronic device 150 and send information to the portable electronic device 150 about achieving improved service. The customer care unit 140 receiving advance notice that a portable electronic device 150 has subscribed for diagnostic services may permit the customer care unit 140 to be better informed and prepared and perhaps be in a position to express sincere empathy and interest should the portable electronic device 150 contact the customer care unit 140. In the event that the portable electronic device 150 does contact the customer care unit 140, a representative of the customer care unit 140 may view a recent summary of activity and initiate discussion about the service experiences of the portable electronic device 150. The customer care unit representative may, during contact with the user of the portable electronic device 150, expressly acknowledge the user's enrollment of the portable electronic device 150 for diagnostic services. The representative also may note and discuss specific problems identified by diagnostic services since enrollment. In an embodiment, a portable electronic device 150 may enroll for diagnostic services by sending a short message service (SMS) message, by making a phone call to a provider of diagnostic services, by sending an electronic mail message to a provider of diagnostic services, or by accessing a world wide web page of a provider of diagnostic services.

The diagnostics application 120 also comprises the aggregation component 124 that gathers data from various sources about the service usage of, the levels of service received by, and service problems experienced by the portable electronic device 150. The aggregation component 124 may gather this information from the portable electronic device 150, from the diagnostics database 130, from a services vendor 170, and/or from another source. The aggregation component 124 also may gather data about network conditions in effect at the times and in the geographic areas in which the portable electronic device 150 accesses voice and data services. The information about network conditions may comprise radio frequency conditions in the geographic areas in which the portable electronic device 150 operates. The information also may comprise service levels provided by wireless services providers associated with services accessed by the portable electronic device 150 during the periods of time in question. Because the provision of wireless communications services may require the involvement of a plurality of service providers, the aggregation component 124 may gather information from more than one service provider in attempting to develop a complete file on the service received by a portable electronic device 150.

The aggregation component 124 receives information from the diagnostics software 152 executing on the portable electronic device 150. The information generated by the diagnostics software 152 about the portable electronic device 150 and its software may be gathered directly as diagnostic data files 154 by the aggregation component 124 executing on the diagnostics server 110 for immediate use. The information gathered as diagnostic data files 154 alternatively may be sent by the portable electronic device 150 to the diagnostics database 130 associated with the diagnostics server 110 for storage and future analysis. The information finally may be sent to another component associated with a wireless communications service that owns or controls the diagnostics server 110 or to an outside services vendor 170.

The aggregation component 124 also extracts information stored in the diagnostics database 130 about past service usage by the portable electronic device 150. In an embodiment, the aggregation component 124 may not continually gather and aggregate information and may instead do so on a periodic or as-needed basis that may be defined by one or more policies. While the diagnostics software 152 may be executing continuously on the portable electronic device 150 and regularly generating diagnostic data files 154, the diagnostics application 120 may not immediately use all of the information generated. Alternatively, the diagnostic data files 154 may be sent by the portable electronic device 150 to the diagnostics database 130 where they are stored. When a service problem is detected or reported or another predefined service-related event occurs, the aggregation component 124 accesses the diagnostics database 130 and draws the stored information that may be relevant to an analysis of service usage and interruption, network conditions, and services vendor performance. The aggregation component 124 also may draw information from the diagnostics database 130 that was sent to the diagnostics database 130 by components other than the portable electronic device 150. This information may include network status, traffic, and performance information generated by other components (not shown) that may be elements of a wireless service provider's network that owns or controls the diagnostics server 110 or a device or component associated with a different provider of wireless communications services.

The aggregation component 124, in addition to gathering diagnostic data files 154 from the portable electronic device 150 as well as from the diagnostics database 130, may also gather information directly from one or more services vendors 170 that provide voice and/or data application services for use by the portable electronic device 150. The services vendor 170 may send information directly to the aggregation component 124 about the services consumed by the portable electronic device 150. Transmissions sent by the services vendor 170 also may include information about the recent services availability of the services vendor 170 and network problems encountered by the services vendor 170 in providing services. The information received from the services vendor 170 may be used to corroborate reports received from the portable electronic device 150 about service interruptions or changes in service quality.

The aggregation component 124 finally may also gather data from a plurality of wireless communications service providers (not shown) that may operate base transceiver stations 180, 182 and other equipment and may provide information about the physical movements of the portable electronic device 150. This information may be useful in investigating service interruptions experienced by the portable electronic device 150. While a variety of voice and data applications may be available to a user of a portable electronic device 150, the physical movements of the portable electronic device 150 and connectivity of the portable electronic device 150 with the base transceiver stations 180, 182 may be one of the primary areas of investigation when service problems are experienced. By analyzing the movements of a portable electronic device 150 and its connections with the base transceiver stations 180, 182 during those movements including signal strength, the causes of a variety of service problems may be investigated and discovered.

The aggregation component 124 may gather information from the portable electronic device 150, the diagnostics database 130, the customer care unit 140 and other internal components, and external components such as the services vendor 170 and a plurality of wireless communications services providers. The aggregation component 124 may edit and package some of the information for later use by other components of the system 100. The aggregation component 124, in gathering and assembling information, may act in response to a policy associated with the subscription arrangement that the portable electronic device 150 may have with a wireless service provider. The policy may describe various situations in which the aggregation component 124 is required to gather information from the components described. The policy may call for different types and amounts of information to be gathered and compiled by the aggregation component 124 depending on the type of event that occurred, for example one or more dropped calls or a data application failure. In an embodiment, a policy may call for information to be gathered by the aggregation component 124 on a regular basis even when no service problem has occurred in the interest of providing some of the information to the portable electronic device 150 and measuring general network performance. Additional information may be gathered from portable electronic devices 150, 160 for reasons unrelated to diagnosing the specific service problems experienced by the portable electronic device 150. For example, but not by way of limitation, information about usage of services that is unrelated to diagnosing service problems of the portable electronic device 150 may serve to improve network performance generally or to promote improved marketing and/or customer profile analysis.

In an embodiment, the customer care unit 140 of a wireless communications service provider that owns or controls the diagnostics server 110 or the customer care unit 140 of a different provider may send instructions to the aggregation component 124 to gather information in preparation for the customer care unit 140 to analyze the wireless service usage of the portable electronic device 150. In an embodiment, the customer care unit 140 may have been contacted by the portable electronic device 150 with a complaint about dropped phone calls or other service interruptions. The customer care unit 140 may have received similar complaints from other portable electronic devices 150, 160 about the same service and may have been tasked with analyzing and determining the root cause of the continuing problem. The customer care unit 140 may engage the aggregation component 124 to gather certain information about the service usage of specific portable electronic devices 150, 160. The aggregation component 124 may be able to carry out instructions to gather the information requested about the portable electronic devices 150, 160. The customer care unit 140 may be able to analyze the gathered information, engage other internal and external parties, determine root cause and resolution, and communicate a resolution to the affected portable electronic devices 150, 160.

The diagnostics application 120 also comprises the analysis component 126 that receives the information gathered and compiled by the aggregation component 124 and applies analytical and investigative techniques to attempt to determine root cause of service interruptions and degradations experienced by the portable electronic device 150. Similar to the aggregation component 124 carrying out information gathering tasks in compliance with a policy associated with at least one portable electronic device 150, the analysis component 126 may analyze the information, possibly based on one or more policies. In an embodiment, a single policy in effect for a plurality of portable electronic devices 150, 160 may describe actions for both the aggregation component 124 and the analysis component 126 to take in response to specific events impacting portable electronic devices 150, 160. The policy may dictate information to be gathered by the aggregation component 124 and analysis to be performed on the information by the analysis component 126.

The analysis component 126 may review reports received from a plurality of wireless service providers about the movement and signaling activity of the portable electronic device 150 as it is engaged in voice calls and/or using data applications. As the portable electronic device 150 moves from one cellular coverage area to another, for example from the coverage area served by the base transceiver station 180 to the coverage area served by the base transceiver station 182, data may be available that may be analyzed by the analysis component 126 and provide insight on why the portable electronic device 150 experienced a service problem. It may be learned, for example, that the portable electronic device 150 had moved into a zone of weak coverage or high radio frequency interference. When information is gathered from a plurality of wireless service providers about radio frequency strength in coverage areas at various times, this information may be combined and analyzed with information received directly from the portable electronic device 150 and with information extracted from the diagnostics database 130 about current and past service usage and service problems. The analysis component 126 may be able to combine, for example, analysis of the radio frequency information received from the various wireless service providers with analysis of the information received from the portable electronic device 150 and diagnostics database 130 to determine a cause of the service problems.

The analysis component 126 may review current and past service data associated with the portable electronic device 150 and services vendors 170 in searching for causes of service problems. The analysis component 126 may submit the data received from the various sources to computer programs, statistical models, and algorithms that may identify trends and abnormalities that indicate causes of problems. The analysis component 126 may analyze call detail records, universal data records describing data sessions, and other records of voice and data activity. Statistical analysis of voice and data activity when in the coverage areas of certain base transceiver stations 180, 182 or when receiving services from a certain services vendor 170 may also point to areas of problems for the portable electronic device 150.

The analysis component 126 may be used by the customer care unit 140 when the customer care unit 140 has been approached by the portable electronic device 150 with a specific problem. The analysis component 126 may also be accessed by the customer care unit 140 when management of a wireless communications service provider becomes aware of a pervasive service problem affecting a plurality of portable electronic devices 150, 160 and seeks to locate a root cause and resolution. The analysis component 126 may respond to directives contained in established policies about predetermined service events. The analysis component 126, by contrast, may also handle individual or one-off requests submitted by the customer care unit 140 or by operations or senior management to deal with a recurring problem affecting a body of portable electronic devices 150, 160.

Depending on the specific technical and customer situation involved, the analysis component 126 will perform a series of analytical steps and may arrive at a single solution, several alternative solutions, or suggestions for workaround or resolution. In an embodiment, the analysis component 126, based on the information received from the aggregation component 124 and its own analysis, may be able to provide only suggestions for further troubleshooting or investigative action. In an embodiment, the analysis component 126 may be unable to determine a solution or even provide suggestions and may refer the problem for escalation to the customer care unit 140 or technical support organization associated with a provider of wireless services or services vendor 170.

The diagnostics application 120 also comprises the recommendation component 128 that presents the findings of the analysis component 126 to the portable electronic device 150. The recommendation component 128 may make a firm recommendation for corrective action to the portable electronic device 150 or it may send a software file or instruction to the portable electronic device 150 that is executed without action by the user of the portable electronic device 150. The recommendation component 128, instead of taking action with regard to the portable electronic device 150, may send a message or a software fix to a services vendor 170 for its execution on a component in its own infrastructure in the event the problem is discovered to originate there. The recommendation component 128 also may provide recommendations or alternative suggestions to the customer care unit 140 for its use in corresponding with the portable electronic device 150.

The recommendation component 128 may engage in non-technical matters and correspondence such as communicating with the enrollment component 122 and the portable electronic device 150 about a possible rebate for some or all of a wireless service plan subscription fee when it is determined that the portable electronic device 150 has suffered as a result of service failures by a wireless communications service provider or a services vendor 170. The recommendation component 128 might alternatively recommend extending the term of the wireless service plan of the portable electronic device 150. The recommendation component 128 may provide input as to the information about service levels that should be disclosed or provided to the portable electronic device 150, if appropriate. Providing selected information about service levels experienced by the portable electronic device 150 may have the effect of building customer loyalty and communicating the interest that a wireless communications service provider has in strengthening and expanding its relationships with its customers.

The base transceiver stations 180, 182 may be any of cellular wireless base stations, for example a Code Division Multiple Access (CDMA), Global System for Mobile Communications (GSM), Universal Mobile Communications System (UMTS), and/or Long-term Evolution (LTE) cellular wireless base station; a World-wide Interoperable Microwave Access (WiMAX) base station; a WiFi access point; or other wireless access devices.

The network 190 promotes communication between the components of the system 100. The network 190 may be any communication network including a public data network (PDN), a public switched telephone network (PSTN), a private network, and/or a combination thereof.

Figure 2:
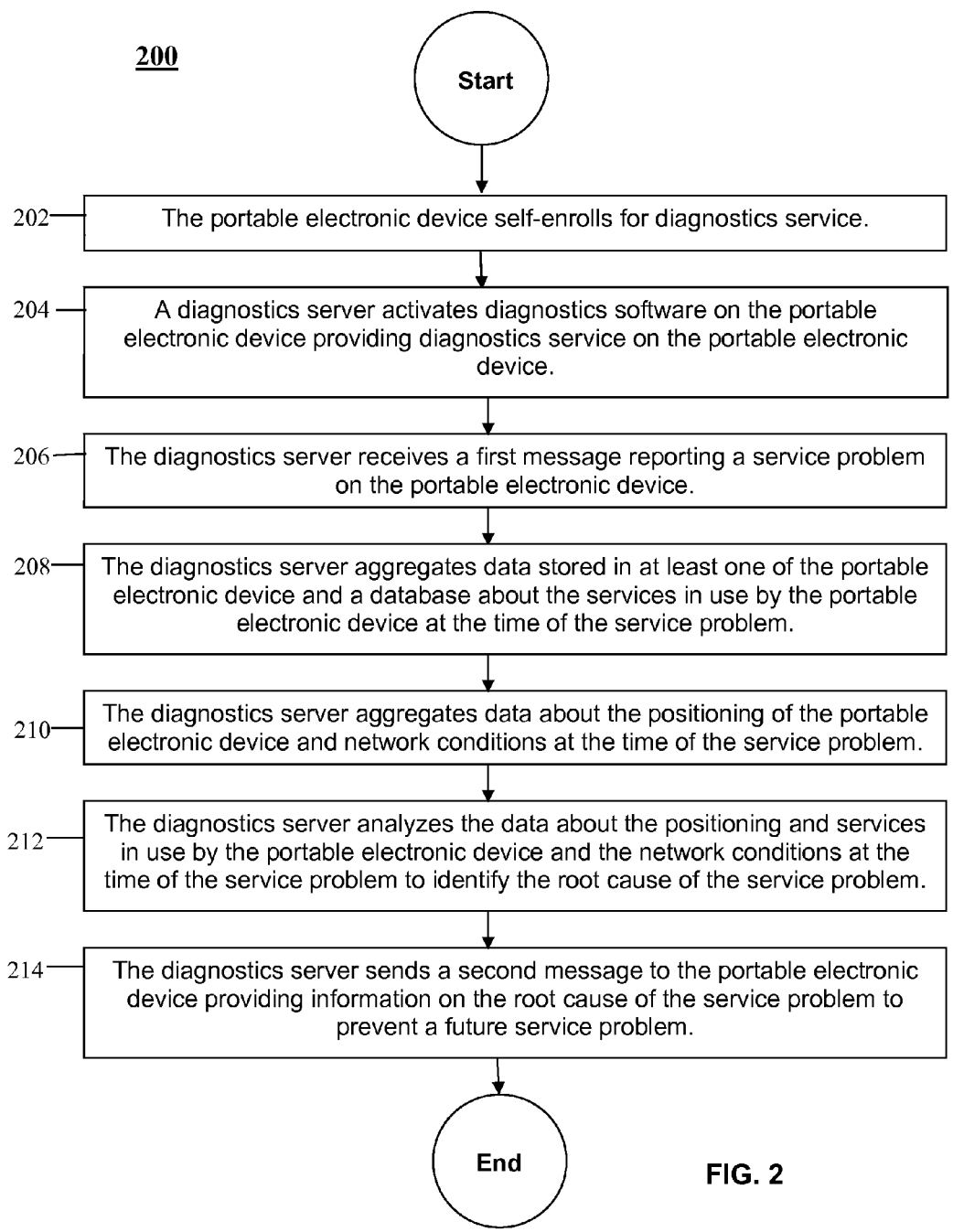
FIG. 2 is a flow chart illustrating a method according to an embodiment of the disclosure.

Turning now to FIG. 2, a processor-implemented method 200 for providing customer initiated mobile diagnostics service is provided. At block 202, the portable electronic device 150 self-enrolls for diagnostics service. The portable electronic device 150 contacts the diagnostics server 110, communicates with the enrollment component 122 about a level of diagnostics service that it needs and completes the enrollment. The portable electronic device 150 previously may have known of the availability of diagnostics service or it may have been advised of the availability of diagnostics service by the diagnostics server 110, the services vendor 170, the customer care unit 140, or some other component or party.

At block 204, the diagnostics server 110 activates software, in an embodiment, diagnostics software 152, on the portable electronic device 150. In an embodiment, the enrollment component 122 may send the diagnostics software 152 wirelessly across the network 190 to the portable electronic device 150 for installation and activation. In some contexts, this may be referred to as the enrollment component 122 and/or the diagnostics server 110 installing and/or activating the diagnostics software 152 on the portable electronic device 150. In another embodiment, the portable electronic device 150 contacts the diagnostics server 110 or another component and causes the diagnostics software 152 to download from the diagnostics server 110 or other component and install on the portable electronic device 150. In another embodiment, the diagnostics software 152 is installed on the portable electronic device 150 in a dormant or inactive form before the portable electronic device 150 self-enrolls for diagnostics service and is activated upon enrollment by commands issued by the enrollment component 122.

At block 206, the diagnostics server 110 receives a first message reporting a service problem experienced by the portable electronic device 150. The diagnostics server 110 may have received the first message directly from the portable electronic device 150, from a services vendor 170, or from another component.

The diagnostics server 110 may send a message to the portable electronic device 150 acknowledging the service problem experienced by the portable electronic device 150. The diagnostics server 110 may communicate to the portable electronic device 150 that the diagnostics server 110 and other components are aware that the portable electronic device 150 experienced the service problem and that the event has been logged and may be investigated. The diagnostics server 110 also may advise that it will attempt to find the root cause of the service problem and may issue a resolution. In an embodiment, the diagnostics server 110 also may provide a rebate or some other remuneration to the portable electronic device 150 for its having suffered the service problem.

At block 208, the diagnostics server 110 gathers information stored in at least the portable electronic device 150 and the diagnostics database 130 about the services in use at the time of the service problem. The aggregation component 124 of the diagnostics application 120 may retrieve or receive directly from the portable electronic device 150 data generated by the diagnostics software 152 about the services in use by the portable electronic device 150 when the service problem occurred. The data gathered may comprise the results of tests run by the diagnostics software 152 at the time of the service problem. In an embodiment, when a service problem, degradation, or other event occurs on a portable electronic device 150, 160, the diagnostics software 152, 162 executing on the portable electronic devices 150, 160, respectively, may be configured to automatically record system information, run tests, and send the information and test results to the diagnostics server 110. The information gathered may include signaling information being sent and received by the portable electronic devices 150, 160 at the time of the service problem.

At block 208, the diagnostics server 110 also gathers information from the diagnostics database 130 about the services used by the portable electronic device 150. The information stored in the diagnostics database 130 may reveal that in the days and hours leading up to the service problem, the voice or data service that eventually was determined to be the cause of the service problem developed a trend that involved weakening or other degradation of the signal associated with the service. The information in the diagnostics database 130 may include hardware and software diagnostic testing results from the time period preceding the service problem and the information may indicate an impending hardware or software failure.

At block 210, the diagnostics server 110 gathers information about the positioning of the portable electronic device 150 at the time of the service problem. This information may be gathered by the aggregation component 124 from a wireless communications services provider with which the portable electronic device 150 has a wireless communications service plan. This information may be gathered from other services providers (not shown) that own or operate base transceiver stations 180, 182 with coverage areas through which the portable electronic device 150 has passed during various time periods, including the time of the service problem. The information gathered will assist in determining if the positioning and movements of the portable electronic device 150 could have played a role in causing the service problem. The information also may provide input about the signal strength of radio frequency transmissions in the coverage areas through which the portable electronic device 150 moved.

At block 212, the diagnostics server 110 analyzes the data gathered at blocks 208 and 210 about the positioning and services in use by the portable electronic device 150 as well as the network conditions at the time of the service problem. The analysis component 126 of the diagnostics application 120 receives the information gathered by the aggregation component 124 and may process the information using statistical models and computer programs and algorithms. These operations may identify trends and service degradations that may not be apparent otherwise. Signaling data and radio frequency conditions may be analyzed using specialized statistical methods that identify lapses or weaknesses in signal strength in some specific geographic areas passed through by the portable electronic device 150. Analysis of the geographic positioning and movements of the portable electronic device 150 may reveal that the portable electronic device 150 during the time of the service problem was physically in an area with poor signal strength and/or high interference. The analysis may alternatively reveal that the services vendor 170 providing a specific data application being accessed at the time of the service problem experienced a service outage or degradation.

At block 214, the diagnostics server 110 sends a second message to the portable electronic device 150 providing information about preventing future service problems. The recommendation component 128 may receive the information from the analysis component 126 and present it to the portable electronic device 150. The information also may provide an explanation of the cause of the service problem. The information may include advice on geographic positioning of the portable electronic device 150 when using the voice or data application that was the subject of the service problem. The information may include recommendations on making adjustments to settings on the portable electronic device 150 that will improve results when using the subject application. In an embodiment, if the cause of the service problem is determined after analysis to be the result of a software or hardware failure either on the portable electronic device 150 or on another component, the recommendation component 128 may arrange for the appropriate software fix or replacement hardware component to be sent to the portable electronic device 150 or other component. In an embodiment, a degraded or failing battery may have caused the problem, and a notification may be sent to the portable electronic device 150 requesting that the user pick up a replacement battery for free at a specific service center and/or retail outlet that is determined to be proximate to the user's current location and/or proximate to the user's home. In an embodiment, an improper mode setting on the portable electronic device 150 may be the source of the problem and be correctable with a setting change, and a notification may be sent to the portable electronic device 150 requesting the user to apply the desired setting change.

Without the portable electronic device 150 having self-enrolled for diagnostic services at block 202, the remainder of the steps of the method 200 may likely never have taken place. Since diagnostics software 152 is not active on the portable electronic device 150 until the portable electronic device 150 self-enrolls for diagnostics service, gathering and reporting of data about the portable electronic device 150 and any service problems does not take place.

Figure 3:
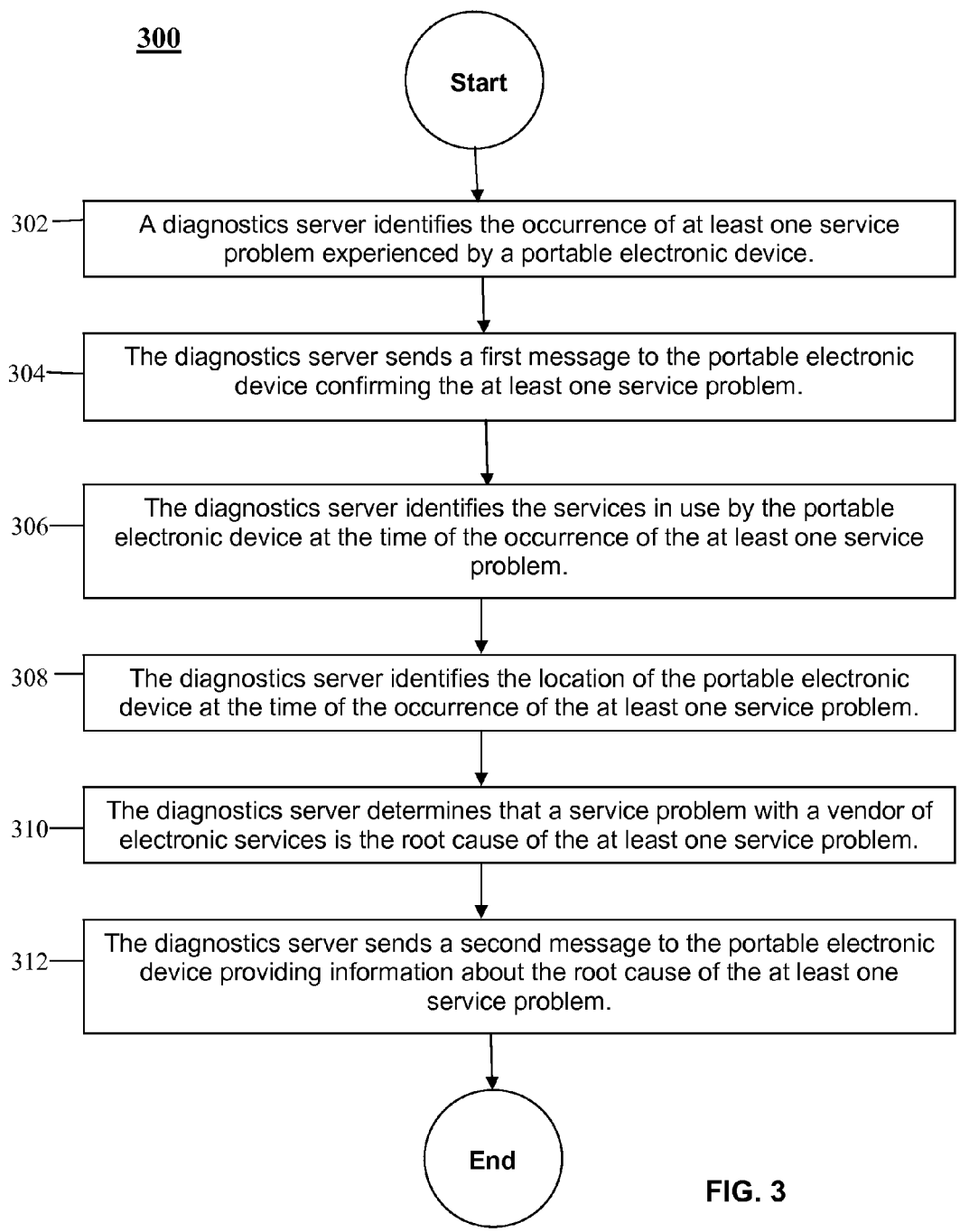
FIG. 3 is a flow chart illustrating another method according to an embodiment of the disclosure.

Turning now to FIG. 3, a processor-implemented method 300 for providing customer initiated mobile diagnostics service is provided. At block 302, the diagnostics server 110 identifies the occurrence of at least one service problem experienced by the portable electronic device 150. In the method 300, in contrast to the method 200, the portable electronic device 150 self-enrolled for diagnostic service prior to the beginning of the method. The at least one service problem experienced at block 302 is therefore detected and recorded and information related to the service problem may be gathered.

At block 304, the diagnostics server 110 sends a first message to the portable electronic device 150 confirming and acknowledging the occurrence of the service problem.

At block 306, the diagnostics server 110 determines and confirms for the portable electronic device 150 the services that were in use by the portable electronic device 150 at the time of the at least one service problem. At block 308, the diagnostics server 110 determines confirms the location of the portable electronic device 150 at the time of the at least one service problem. At blocks 306 and 308, the aggregation component 124 of the diagnostics application 120 is gathering the information needed to analyze the at least one service problem and may engage in communication with the portable electronic device 150 to confirm information it is gathering.

The aggregation component 124 may communicate with other components to gather information about the service problem and signaling and radio frequency characteristics at the time of the event.

At block 310, the diagnostics server 110 determines that a provider of electronic services provider was the cause of the at least one service problem. The analysis component 126 receives the information from the aggregation component 124, analyzes the information using its statistical model, algorithms, and other tests, and determines that the service problem was due to a failure in the infrastructure of a services vendor 170 of voice, data, or other services to which the portable electronic device 150 is a subscriber. At the time of the at least one service problem identified at block 302, the portable electronic device 150 may have been simultaneously using voice and data services provided by a plurality of services vendors 170. If the portable electronic device 150 failed entirely or "crashed," it may have been impossible for the user of the portable electronic device 150 to determine which one or more data or voice applications caused the failure. It may have been impossible for the user to determine if the service problem was caused by a voice or data application at all. At block 310, the analysis component 126 through its analysis and testing determines that a failure in the infrastructure of the services vendor 170 was the cause of the at least one service problem.

At block 312, the diagnostics server 110 sends a second message to the portable electronic device 150 providing information about avoiding future service problems. The recommendation component 128 of the diagnostics application 120 contacts the portable electronic device 150 and may advise the portable electronic device 150 to use fewer or a different combination of voice and data applications at the same time. The second message may also advise against using certain applications while using the particular application that was the subject of the at least one service problem. The second message may provide advice about making a configuration setting change on the portable electronic device 150. The second message may finally provide advice about geographic locations and movements by the portable electronic device 150 while using the application that was the subject of the at least one service problem.

Figure 4:
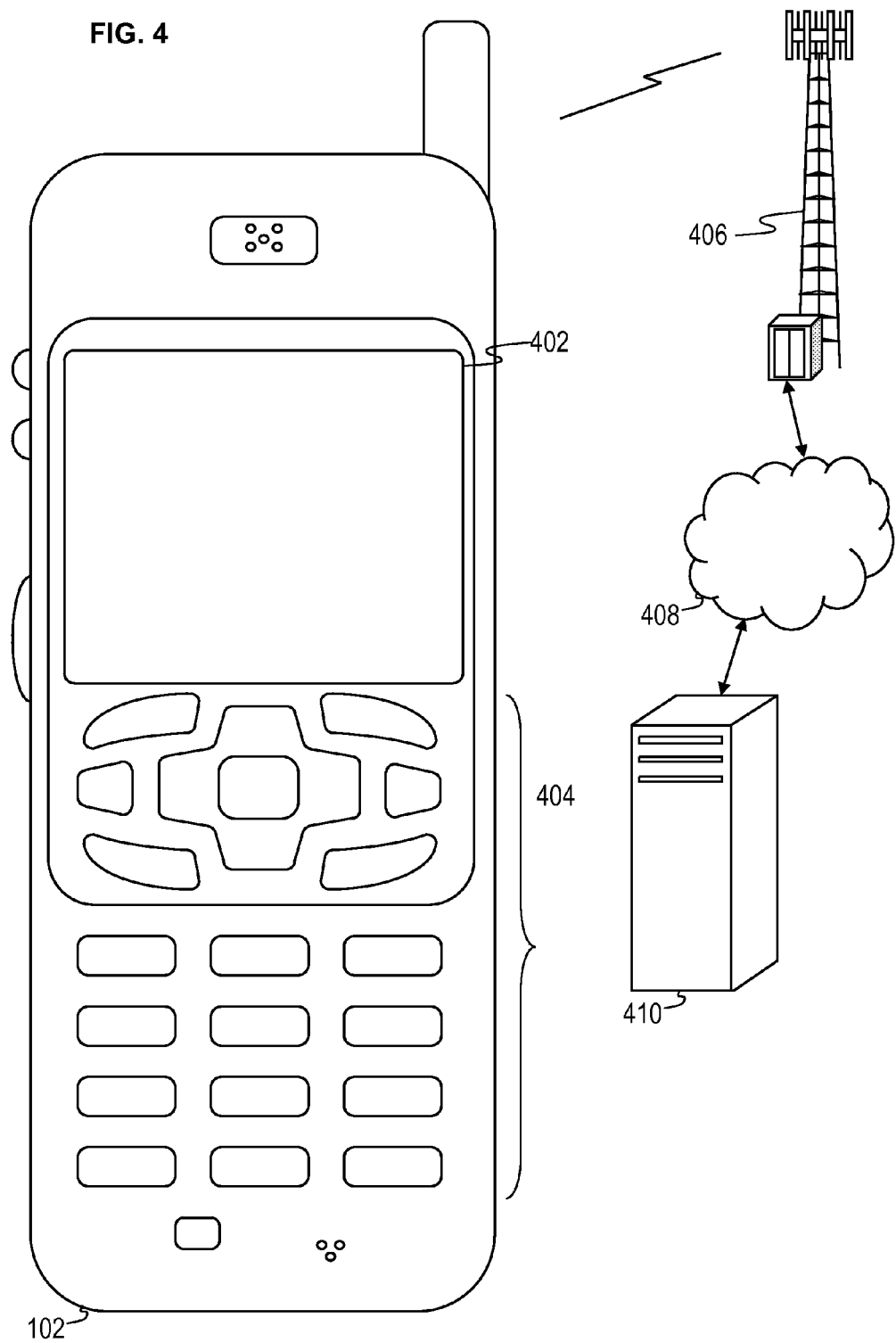
FIG. 4 is an illustration of a portable electronic device according to an embodiment of the disclosure.

FIG. 4 shows a wireless communications system including a mobile device 102. FIG. 4 depicts the mobile device 102, which is operable for implementing aspects of the present disclosure, but the present disclosure should not be limited to these implementations. In an embodiment, the mobile device 102 may be an illustrative example of the portable electronic device 150, 160 described in the system 100. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 402 and a touch-sensitive surface and/or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 402 to show a web page. The web page may be obtained via wireless communications with a base transceiver station (BTS) 406, a wireless network access node, a peer mobile device 102 or any other wireless communication network or system. While a single base transceiver station 406 is illustrated, it is understood that the wireless communication system may comprise additional base transceiver stations. In some instances, the mobile device 102 may be in communication with multiple base transceiver stations 406 at the same time. The base transceiver station 406 (or wireless network access node) is coupled to a wired network 408, such as the Internet. Via the wireless link and the wired network, the mobile device 102 has access to information on various servers, such as a server 410. The server 410 may provide content that may be shown on the display 402. Alternately, the mobile device 102 may access the base transceiver station 406 through a peer mobile device 102 acting as an intermediary, in a relay type or hop type of connection.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality. The diagnostics software 614 corresponds to the diagnostics software 152, 162 described in the system 100. The diagnostic data files 616 correspond to the diagnostic files 154, 164 described in the system 100.

Figure 7:
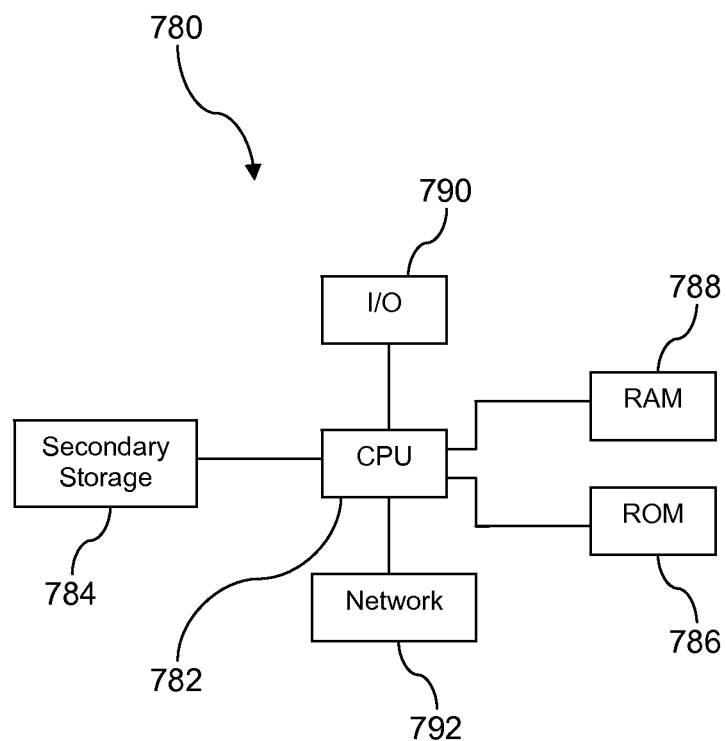
FIG. 7 illustrates an exemplary computer system suitable for implementing some aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide 20 virtual servers on 4 physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A customer initiated mobile diagnostics service system, comprising:
    a database containing diagnostic data;
    a computer system; and
    an application, that when executed on the computer system,
        receives an enrollment message from a portable electronic device to self-enroll for diagnostic services,
        sends a message to activate diagnostics software on the portable electronic device upon the portable electronic device's self-enrollment,
        subsequently receives a plurality of notifications of a plurality of service problems experienced by the portable electronic device from one of the portable electronic device, a service vendor, or another component,
        analyzes data stored by at least one of the portable electronic device or the database to identify one or more root causes of the plurality of service problems in response to receipt of the plurality of notifications of the plurality of service problems, wherein the analyzed data comprises voice and data communications activity and operating conditions that are monitored over time during times of normal operation of the portable electronic device and when the plurality of service problems occur, and
        sends information to the portable electronic device comprising resolutions of the plurality of service problems based on the one or more root causes in response to identifying the one or more root causes.

2. The system of claim 1, wherein the plurality of notifications of the plurality of service problems is received from at least one of the portable electronic device or a component on a communications network.

3. The system of claim 1, wherein the plurality of service problems is related to at least one of a voice application and a data application accessible on the portable electronic device.

4. The system of claim 1, wherein the plurality of service problems comprises at least one of a hardware or a configuration problem on the portable electronic device.

5. The system of claim 1, wherein the data stored comprises keypad and voice entries made into the portable electronic device and usage of services associated with the portable electronic device.

6. The system of claim 1, wherein the data stored is related to at least one of the use of services by the portable electronic device, geographic positioning of the portable electronic device, wireless network conditions, or services vendors' status and performance.

7. The system of claim 1, wherein the application provides the data stored to a customer care function for at least one of further analysis of the one plurality of service problems or preparation for potential contact with a user of the portable electronic device.

8. A processor-implemented method for providing customer initiated mobile diagnostics service, comprising:
    receiving, by a diagnostics server, a request to self-enroll for diagnostics service from a portable electronic device;
    activating, by the diagnostics server, diagnostics software on the portable electronic device providing diagnostics service on the portable electronic device upon the portable electronic device's self-enrollment;
    subsequently receiving, by the diagnostics server, a plurality of messages reporting a plurality of service problems on the portable electronic device from at least one of the portable electronic device, a service vendor, or another component;
    aggregating, by the diagnostics server, data stored in at least one of the portable electronic device or a database about the services in use by the portable electronic device at the time of the plurality of service problems in response to receiving the plurality of messages;
    aggregating, by the diagnostics server, data about the positioning of the portable electronic device and network conditions at the time of the plurality of service problems;
    analyzing, by the diagnostics server, the data about the positioning and services in use by the portable electronic device and the network conditions at the time of the plurality of service problems to identify one or more root causes of the plurality of service problems, wherein the analyzed data comprises voice and data communications activity and operating conditions that are monitored over time during times of normal operation of the portable electronic device and when the plurality of service problems occur; and sending, by the diagnostics server, an informative message to the portable electronic device containing information on the one or more root causes of the plurality of service problems to prevent a future service problem.

9. The method of claim 8, wherein the diagnostics server receives the plurality of messages from at least one of the portable electronic device or a provider of at least one of voice and data services.

10. The method of claim 8, wherein the information provided in the notification comprises at least one of recommendations for making adjustments to settings of an application executing on the portable electronic device or recommendations for geographic positioning of the portable electronic device while using the application.

11. The method of claim 8, wherein the diagnostics server further sends an acknowledgement message to the portable electronic device acknowledging the plurality of service problems on the portable electronic device.

12. The method of claim 8, wherein the plurality of service problems is associated with an application executing on the portable electronic device.

13. The method of claim 8, wherein the diagnostics server analyzing data about the positioning of the portable electronic device and services in use by the portable electronic device further comprises analyzing data associated with a vendor providing an application.

14. The method of claim 8, wherein the diagnostics server relies in part on the operation of the diagnostics software on the portable electronic device to identify the plurality of occurrences of the plurality of service problems.

15. A processor-implemented method for providing customer initiated mobile service diagnostics, comprising:

receiving, by a diagnostics server, a request to self-enroll for diagnostics service from a portable electronic device;

activating, by the diagnostics server, diagnostics software on the portable electronic device providing diagnostics service on the portable electronic device upon the portable electronic device's self-enrollment;

identifying, by a diagnostics server, a plurality of occurrences of a plurality of service problems experienced by a portable electronic device;

sending, by the diagnostics server, a confirmation message to the portable electronic device confirming the plurality of service problems in response to identifying the plurality of occurrences of the plurality of service problems;

identifying, by the diagnostics server, services in use by the portable electronic device at the time of the plurality of occurrences of the plurality of service problems;

identifying, by the diagnostics server, the location of the portable electronic device at the time of the plurality of occurrences of the plurality of service problems;

analyzing, by the diagnostics server, the data about the location and the services in use by the portable electronic device and network conditions at the time of the plurality of service problems to identify one or more root causes of the plurality of service problems, wherein the data comprises voice and data communications activity and operating conditions that are monitored over time during times of normal operation of the portable electronic device and when the plurality of service problems occur, determining, by the diagnostics server, the one or more root causes of the plurality of service problems based on at least one of the services in use by the portable device or the location of the portable electronic device;

identifying, by the diagnostics server, a vendor of electronic services associated with the one or more root causes in response to the determination of the one or more root causes; and sending, by the diagnostics server, an informative message to the portable electronic device providing information about the one or more root causes of the plurality of service problems.

16. The method of claim 15, wherein the diagnostics server relies in part on the operation of the diagnostics software on the portable electronic device to identify the plurality of occurrences of the plurality of service problems.

17. The method of claim 15, wherein identifying the services in use by the portable electronic device at the time of the plurality of service problems enables the identifying of the vendor associated with the one or more root causes of the plurality of service problems.

18. The method of claim 15, wherein the portable electronic device is one of a mobile telephone, a personal digital assistant (PDA), or a media player.

* * * * *